US006848789B1

(12) United States Patent
Yancy

(10) Patent No.: US 6,848,789 B1
(45) Date of Patent: Feb. 1, 2005

(54) SYSTEM, METHOD AND ARTICLE OF MANUFACTURE TO DETERMINE AND COMMUNICATE OPTICAL LENS SIZING AND PRESCRIPTION INFORMATION

(76) Inventor: Virgil Thomas Yancy, 8438 S. Allegheny Ave., Tulsa, OK (US) 74137

( * ) Notice: Subject to any disclaimer, the term of this patent is extended or adjusted under 35 U.S.C. 154(b) by 424 days.

(21) Appl. No.: 09/832,747

(22) Filed: Apr. 11, 2001

Related U.S. Application Data

(62) Division of application No. 09/488,274, filed on Jan. 20, 2000.

(51) Int. Cl.[7] ................................................ G02C 7/02
(52) U.S. Cl. ...................... 351/177; 351/205; 351/222; 351/224; 351/246; 33/28; 451/10; 359/200.33
(58) Field of Search ................................ 356/124–127, 356/601; 33/28, 200, 507; 451/10–11, 5, 42; 359/200.33, 447; 351/177, 205, 222–224, 246

(56) References Cited

U.S. PATENT DOCUMENTS

| | | | |
|---|---|---|---|
| 1,790,572 A | 1/1931 | Bugbee, Jr. | |
| 2,190,582 A | 2/1940 | Wolf | 88/56 |
| 2,546,329 A | 3/1951 | Barile | 33/1 |
| 3,313,031 A | 4/1967 | Lowe | 33/174 |
| 4,361,830 A | 11/1982 | Honma et al. | 340/146.3 |
| 4,656,590 A | 4/1987 | Ace | 364/474 |
| 4,817,024 A | 3/1989 | Saigoh | 364/577 |
| 5,257,198 A | 10/1993 | van Schoyck | 364/474.02 |
| 5,428,448 A | 6/1995 | Albert-Garcia | 356/376 |
| 5,485,399 A | 1/1996 | Saigo et al. | 364/525 |
| 5,673,490 A | 10/1997 | Hill | 31/1 |
| 5,825,476 A | * 10/1998 | Abitol et al. | 356/124 |
| 5,844,671 A | * 12/1998 | Kajino et al. | 356/124 |
| 5,847,819 A | * 12/1998 | Yanagi | 356/124 |
| 5,867,652 A | * 2/1999 | Hurvig | 709/203 |
| 5,926,247 A | 7/1999 | Kimura | 351/41 |
| 5,967,879 A | * 10/1999 | Gottschald | 451/5 |
| 5,973,772 A | * 10/1999 | Fukuma et al. | 356/124 |

* cited by examiner

Primary Examiner—Frank G. Font
Assistant Examiner—Sang H. Nguyen
(74) Attorney, Agent, or Firm—Winstead Sechrest & Minick P.C.

(57) ABSTRACT

The proposed invention calculates the circumference of an optical lens taking into consideration external variations in lens size and shape. The invention, utilizing a uniquely designed optical lens tracing pen in conjunction with a specifically designed tracing template provides for a consistent method of measure with respect to the outermost ridge of a traced lens. The lens is traced utilizing the specifically designed invention pen, and scanned into a software system which receives the traced image and plots a lens shape based upon a calculated distance between first color template axis indicators and a second color pen tracing. The system further provides for a number of options to allow specification a prescription to be utilized in conjunction with the lens sizing information as well as the automated and transparent downloading of computer software and additional lens shape offerings reflected in updated versions of the invention.

6 Claims, 16 Drawing Sheets

FIG. 2
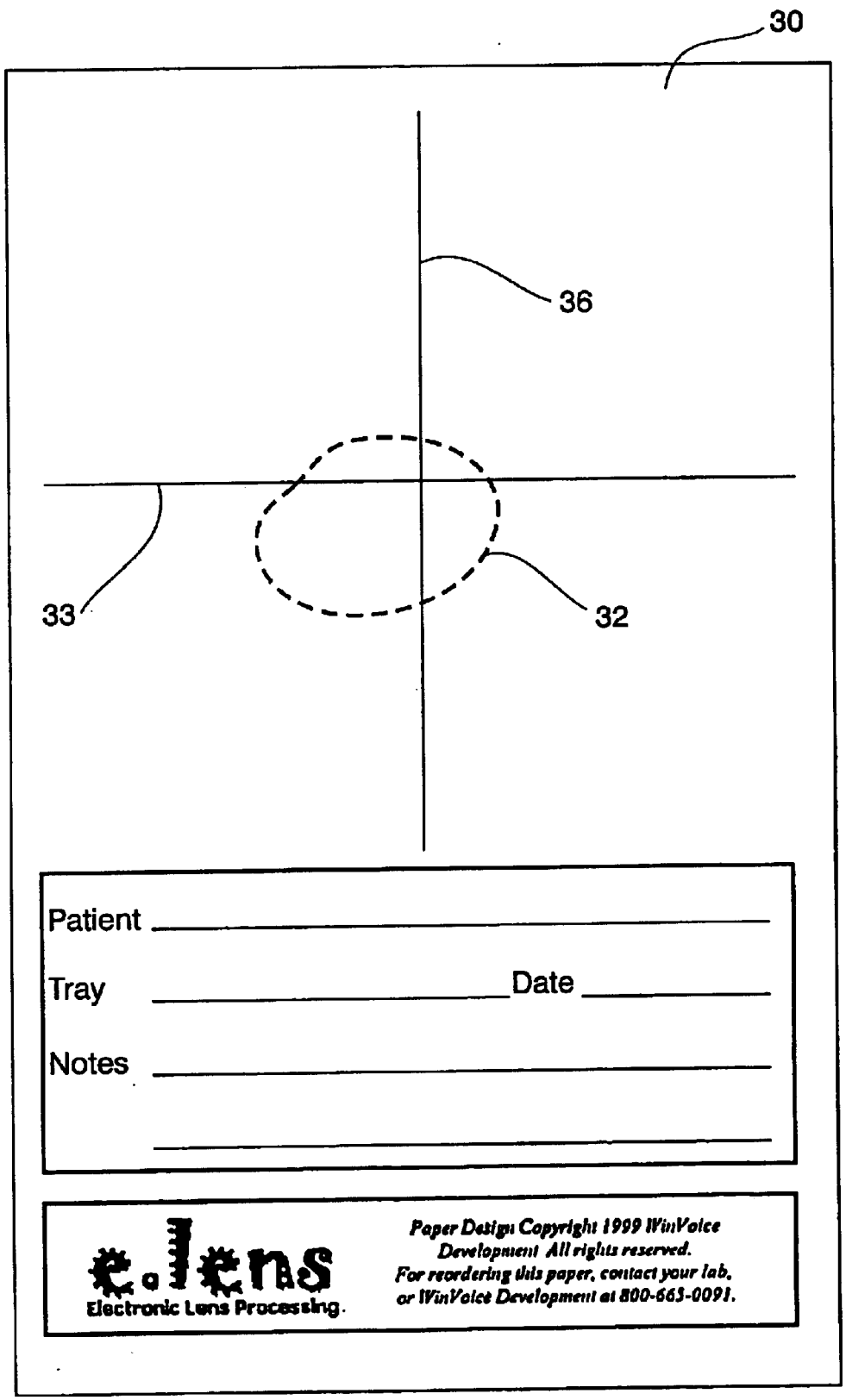
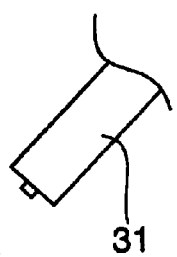

SYSTEM, METHOD AND ARTICLE OF MANUFACTURE TO DETERMINE AND COMMUNICATE OPTICAL LENS SIZING AND PRESCRIPTION INFORMATION

REFERENCE TO PENDING APPLICATIONS

This is a divisional application of application Ser. No. 09/488,274 filed Jan. 20, 2000.

REFERENCE TO MICROFICHE APPENDIX

This application is not referenced in any microfiche appendix.

TECHNICAL FIELD OF THE INVENTION

The invention relates in general to optical lens processing and more specifically, to a system, method and article of manufacture to determine and communicate optical lens sizing and prescription information.

BACKGROUND OF THE INVENTION

Subject matter related to optical lens sizing is well known in the art. For example:

U.S. Pat. No. 1,790,572 issued on Jan. 27, 1931 to Lucian W. Bugbee Jr. discloses a lens inspecting and layout device.

U.S. Pat. No. 2,190,582 issued on Feb. 13, 1940 to Fayette E. Wolf discloses a template for edging lenses.

U.S. Pat. No. 2,546,329 issued on Mar. 27, 1951 to Henry C. Barile discloses a lens inspecting and layout device.

U.S. Pat. No. 3,313,031 issued on Apr. 11, 1967 to George L. Lowe discloses an ophthalmic lens former.

U.S. Pat. No. 4,361,830 issued on Nov. 30, 1982 to Kazuhiro Honma et al discloses a device for displaying feature of contour images wherein the x-y coordinates are determined of a multiplicity of points set at very small intervals of a fixed value on a contour line, the coordinates of a selected number of points on either side of one (central point) of the aforementioned multiplicity of points are averaged, the two points corresponding to the two sets of averaged coordinates are connected by a straight line, a perpendicular line is drawn to this straight line from the aforementioned central point, and the distance from the central point to the foot of the perpendicular line on the straight line is calculated. This distance varies with the change in the shape of the contour line. By finding this distance with respect to each of the points on the contour line and displaying the distances found, there can be obtained a figure indicative of features of the shape of the contour image.

U.S. Pat. No. 4,656,590 issued on Apr. 7, 1987 to Ronald Ace discloses a system for computerizing eyeglass geometrical frame pattern records at a central location for access by eyeglass retailers or wholesalers is disclosed. The pattern records are stored in a central computer in the form of instructions for a remote pattern cutting machine. The instructions define the shape of the eyeglass frame in quasi-polar coordinates, either using the frame's geometrical "box" center as the origin or using the optical center of the lens as the origin, the computer providing the desired conversion between the two pattern centers. When an optician has a call for edging a lens for a particular frame, the optician obtains the edge shape data from the central computer by specifying the frame and, if desired, by specifying the decent ration of the optical center from the frame geometric center. The central computer may convert its frame shape data from the geometric center to the optical center, if desired, and then provides the necessary data for cutting the pattern. Data is transmitted to and is stored at a remote pattern cutter which then utilizes the data to cut a full-size pattern from an inexpensive plastic workpiece, or pattern blank. Then the optician may compare the pattern with the frame to make sure that it is correct before edge-grinding the lens to the shape of the pattern, thereby greatly simplifying the present labor-intensive process of preparing lenses for frames.

U.S. Pat. No. 4,817,024 issued on Mar. 28, 1989 to Tsuyoshi Saigoh discloses a spectacle-frame shape data producing method in which a spline interpolation function is used to digitize the shape M of a spectacle frame to provide spectacle-frame shape data, and the shape M of the spectacle frame is obtained by a lens maker's factory to produce spectacle lenses having prescribed values and an optimum thickness conforming to the spectacle frame.

U.S. Pat. No. 5,428,448 issued on Jun. 27, 1995 to Pablo Albert-Garcia discloses a method and apparatus for determining the size and shape to which a finished lens used to make an eyeglass lens is to be cut. Coordinates which define the outer perimeter of a lens are determined by illuminating either an eyeglass frame or a lens. An image of the shadow of the frame or lens is captured by an imaging device. A first linear polarizing filter is positioned optically between a light source and the membrane. A second linear polarizing filter, oriented at 180 degrees from the first filter, is placed optically between the membrane and the camera. Thus, the first and second polarizing filters allow a high definition image to be attained for substantially transparent plastic. A general purpose computer: (1) identifies the edges of the image so as to define the perimeter; (2) orients the image by identifying an orientation line placed upon a lens, if the image is of a lens which is not within a frame, and (3) measures the distance between lenses if an eyeglass frame is being measured. If an eyeglass frame is being measured, then a depth gauge indicator is used to measure the depth of a groove in the frame into which a lens is recessed when mounted in the eyeglass frame. Once the coordinates of the lens are determined, they may be verified by comparison with the frames or lens from which they were derived. Further, the coordinates of the outer perimeter of the edged lens may be determined to verify the accuracy of the operation.

U.S. Pat. No. 5,485,399 issued on Jan. 16, 1996 to Tsuyoshi Saigo et al discloses a spectacle lens supply method for a system which includes a terminal installed at a lens orderer side and at least a computing device installed at a lens processor side and connected to the terminal via a communication line, for supplying spectacle lenses. In the lens supply method, the terminal transmits processing condition data including at least one of lens information, frame information, prescription values, layout information and processing information to the computing device, and the computing device calculates a desired lens shape including a bevel figure based on the received processing condition data, creates accept/reject information as to whether a lens process including beveling is possible or not, based on the result of the calculation, and transmits the accept/reject information to the terminal, which information is displayed at the terminal to permit the lens orderer to learn whether the lens process including beveling is possible or not.

U.S. Pat. No. 5,673,490 issued on Oct. 7, 1997 to Kerry Jean Hill discloses an alignment mechanism and method for using the same in which the alignment mechanism includes a sheet of translucent (including transparent) material with a plurality of horizontal and vertical intersecting traces positioned to form a grid. In a preferred embodiment, the sheet of translucent material is made of static cling vinyl to allow the sheet to hold itself to glass and other smooth surfaces. The sheet of material can also include a centered X and Y axes to enable the user to determine the center of the sheet—thereby allowing the user to appropriately position art works relative to one another without relying on unaided perception.

U.S. Pat. No. 5,926,247 issued on Jul. 20, 1999 to Toshio Kimura discloses a method of manufacturing spectacles by obtaining accurate frame shape information without performing a frame shape measurement in the spectacle store. In this method, frame shape information is first obtained after a spectacle frame is manufactured in a factory. Moreover, frame-related information, which includes the obtained frame shape information, or readout information, according to which this frame-related information is read out, is preliminarily added to the spectacle frame. Thereafter, in a spectacle store, the frame-related information is read from the spectacle itself or from a storage unit or the like by using the information added to the spectacle frame as a key. Thus, frame shape information, which is needed when obtaining lens processing information, is obtained therein. The present invention further provides a spectacle frame for use in this method.

U.S. Pat. No. 5,257,198 issued on Oct. 26, 1993 to Carol G. Van Schoyck purports to disclose and claim a method of transmitting edger information to a remote numerically controlled edger by which an eye care professional can convey edger information to a remotely located optician having a numerically controlled edger capable of shaping and beveling lenses in which the eye care professional removes the demonstration lenses from frames which the wearer has selected, places the demonstration lenses on a pattern scale and aligns the horizontal axis of the lenses, traces the outline of each of the demonstration lenses on the pattern scale, places the pattern scale into an optical scanning digital data transmitter wherein the patterns of the lenses are converted to digital information, transmitting the digital information to a computer, and generating an output signal by means of the computer to drive a numerically controlled edger to cause the edger to shape and bevel eyeglass lenses to clone the demonstration lenses.

The Van Schoyck patent (hereinafter "Van Schoyck") contains one independent claim and recites "A method by which an eye care professional can convey edger information to a remotely located optician in which the eye care professional has eyeglass frames selected by or for the user, the eyeglass frames having demonstration lenses therein, the optician having a numerically controlled edger capable of shaping and beveling lenses in response to digital information signals, comprising the steps of:

(a) making a horizontal axis on said demonstration lenses with an ophthalmoscopic while said demonstration lenses are in said eyeglass frames;

(b) removing each said demonstration lens having said horizontal axis marked thereon from said eyeglass frames;

(c) placing said demonstration lenses on a lens pattern scale having a horizontal axis line thereon and aligning said horizontal axis marked on each demonstration lens with the lens pattern scale horizontal axis line;

(d) tracing an outline of each of said demonstration lenses onto said lens pattern scale;

(e) placing said lens pattern scale having said demonstration lenses outline marked thereon into an optical scanning digital data transmitter wherein the patterns of the lenses are converted to digital information signals, steps (a) through (e) being carried out at the location of said eye care professional;

(f) transmitting said digital information signals by a data transmission carrier to a computer at the location of said optician, the data being received and stored in said computer; and (g) processing said digital information signals in said computer to provide operating instruction signals for use in said numerically controlled edger to cause said edger to shape and bevel eyeglass lenses to clone said demonstration lenses, the shaped and beveled lenses then being ready for delivery to said eye care professional for insertion into said eyeglass frames.

When comparing the above cited elements of Van Schoyck's single independent claim to the present invention, it is clear that the present invention does not require (1) the expressed representation of a horizontal axis on demonstration lenses with an ophthalmoscope while said lenses are in eyeglass frames, (2) positioning demonstration lenses along a specifically pre-determined horizontal axis along an expressly indicated horizontal axis line, or (3) the tracing and communication of multiple lenses as embodied within an eyeglass frame.

BRIEF SUMMARY OF THE INVENTION

The proposed invention calculates the circumference of an optical lens taking into consideration external variations in lens size and shape. The invention, utilizing a uniquely designed and purposed pen in conjunction with a uniquely designed optical lens representation template provides for a superior and consistent method of measure with respect to the circumference and shape of a represented (a.k.a "traced") lens. The invention is practiced by placing a lens object upon an optical lens representation template which incorporates a cross-hair first color positioning indicator. The lens is then traced utilizing a second color marking means embodied as a uniquely designed optical lens tracing pen, and then scanned into a software system which receives the traced image and plots a lens shape based upon calculated distance measure(s) between the first color positioning indicator and the second color pen tracing. The system further provides for a number of options to allow a doctor to specify a prescription to be utilized in conjunction with the lens configuration.

It is a primary object of the instant invention to provide for an exactness of measure of optical lens circumference and shape unrealized in the present art.

It is a further object of the instant invention to allow a physician to automatically dial his or her lens laboratory, connect to said laboratory; server central processing unit and receive, in an automated and transparent manner, an updated version of the invention's software as well as new lens design availability whenever a new lens becomes available at the lab or a new feature is implemented into the present invention's software.

It is another object of the instant invention to eliminate the need to transport eyeglass frames to a laboratory location where lens edging or sizing is to be performed, thus, eliminating costs associated with transport of said frames and the attendant time delay of shipping frames to offsite laboratories.

Yet another object of the instant invention is to eliminate the need of exact placement or positioning of demonstration lenses on a horizontal axis which must be prescored and determined on an optical lens, or lenses.

It is a further object of the instant invention to eliminate the need for indicating the horizontal axis on demonstration lenses with an ophthalmoscope.

Yet an additional object of the instant invention is to eliminate the need for tracing an optical lens while embodied within an eyeglass frame.

Another object of the instant invention to provide graphic user interfaces to facilitate ease of use when executing the invention in its preferred embodiment.

Another object of the instant invention is to allow a user to view entered prescription data depicted in a graphical representation on a computer screen and verify such information is actually desired and is accurate.

Another object of the invention is to allow the user to vary a lens size and axis to determine a final size and axis prior to transmitting a lens order to a lens preparation laboratory.

Another object of the instant invention is to eliminate the inaccuracies of tracing an optical lens, trial lens or pattern inherent in utilization of prior art marking devices.

Other objects and further scope of the applicability of the present invention will become apparent from the detailed description to follow, taken in conjunction with the accompanying drawings wherein like parts are designated by like reference numerals.

DESCRIPTION OF THE DRAWINGS

FIG. 2 is an illustration of an optical lens representation template utilized in the invention's preferred embodiment.

FIG. 14 is a representative screen image illustration of the invention's new order and edit screen as utilized in the invention's preferred embodiment.

FIG. 15 is a representative screen image illustration of the invention's miscellaneous screen as utilized in the invention's preferred embodiment.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
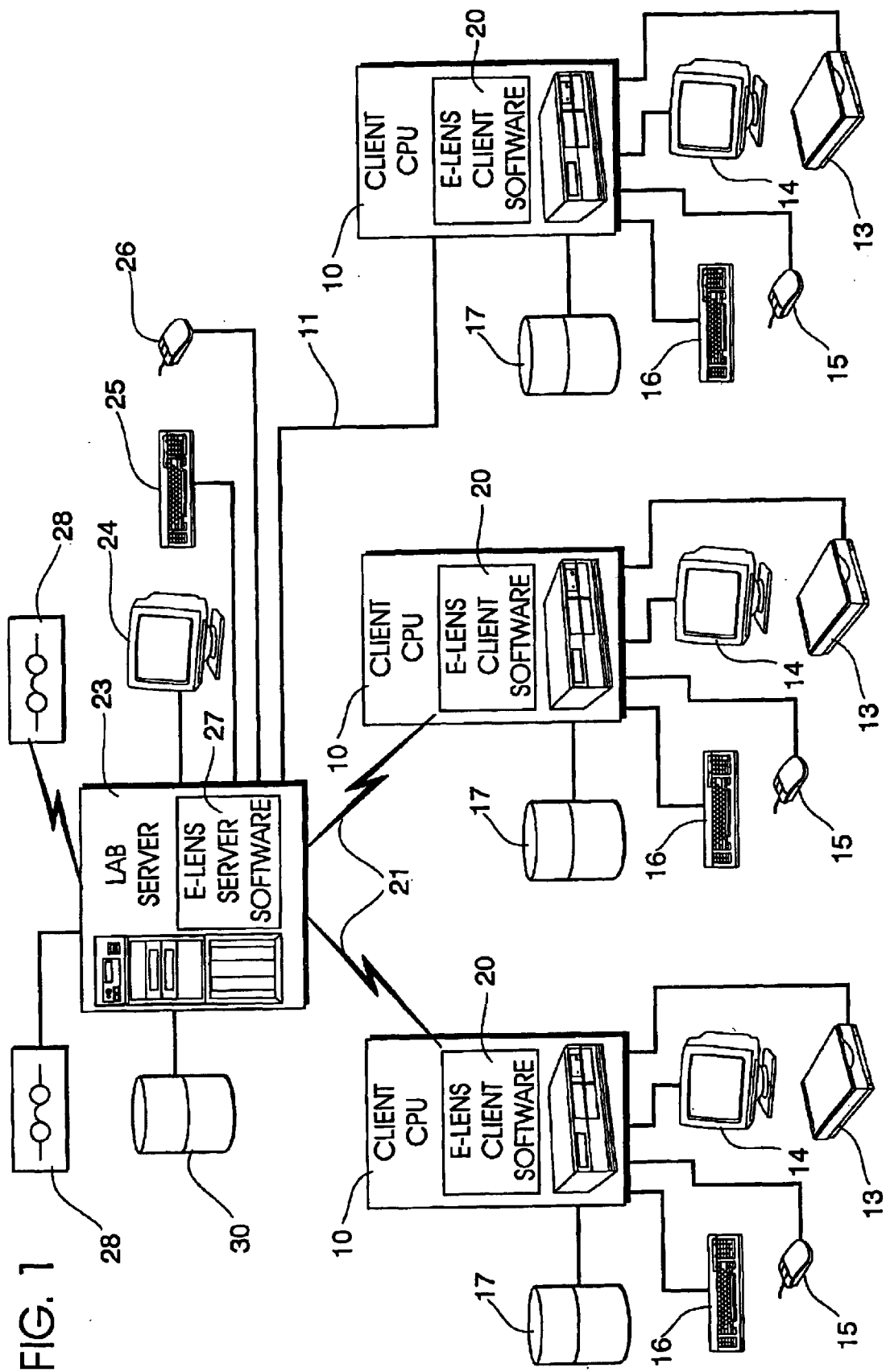
FIG. 1 is an overview illustration of hardware and software components as practiced in the invention's preferred embodiment.

Returning now to FIG. 1. FIG. 1 is an overview illustration of hardware and software components as practiced in the invention's preferred embodiment. The invention is comprised of a client central processing unit 10 communicably attached to a computer scanner 13 and computer input means such as, but not limited to, a keyboard 16 or a mouse 15. First software 20 for determining and transmitting optical lens sizing and prescription data resides within the client central processing unit 10 embodied within a computer readable memory such as read only access memory (ROM), read access memory (RAM), or a transportable memory storage medium, such as but not limited to, a compact disk (CD) or floppy disk, and second software 27 for responding to information transmitted by the first software 20 executed from within said server central processing unit 23. The server central processing unit 23 is communicably attached to the client central processing unit 10 by a network communication means 21, such as but not limited to dial-up access, wide area networks (WAN), campus area networks (CAN), metropolitan area networks (MAN), virtual private networks (VPN), or other communication infrastructure and transmission protocols well known and practiced by those skilled in the art. Alternatively, the server central processing unit 23 could be communicably attached to the client central processing unit 10 via a "hard wire" or cable means 11 such as, but not limited to coax, twinax or other communications cable commonly known and practiced by those in the art. The server (a.k.a. central processing unit) lab 23 may be connected to a plurality of client central processing units 10 by the aforestated networking or hard wired communications means. Consequently, second software 27 residing within the server central processing unit 23 and first software 20 residing and executed from within a client central processing unit 10 reciprocally transmit and communicate information such as but not limited to, patient, optical lens sizing, and invention software update information via the afore stated communications means 21. The client central processing unit 10 in an alternative embodiment, may also be communicably attached to a direct access (DASD) storage device 17 from which said first software 20 may be retrieved, loaded into, and executed from the read access memory (RAM) of the client CPU 10. The server central processing unit 23 also provides as an option an auxiliary storage device such as but not limited to a direct access storage device (DASD) 30 from which said second software may be retrieved, loaded into the read access memory (RAM) and executed from the said server central processing unit 23. FIG. 1 also illustrates a computer output device 24 communicably attached to the server central processing unit 23. Though represented pictorially as a display monitor in FIG. 1, said computer output device 24 would include any such output device well known to those skilled in the art. Without limitation, such devices would also include printers, or auxiliary storage devices 30. The server central processing unit 23 can, and as practiced in the invention's preferred embodiment is, also attached to an optical lens processing device 28 to which sizing and prescription information is communicated from said second software 27 residing within said server central processing unit 23. Such optical lens processing devices are well known to those skilled in the art and include software and hardware components marketed under without limitation, the names of Layout Marker, Lens Blocker or Lens Edger. As clearly illustrated in FIG. 1, the server central processing unit 23 can be communicably attached to a plurality of said optical lens processing devices 28.

The practice of the invention is first initiated by tracing, hereinafter synonmously referred to as "representing", an optical lens object onto an optical lens representation template. Said initiation and methodology deployed to practice the invention in its preferred embodiment, is discussed and disclosed in association with FIGS. 2 through 11. Turning now to FIG. 2.

FIG. 2 illustrates an optical lens representation template 30 as utilized in the invention's preferred embodiment. Utilizing the invention's optical lens tracing pen 31, an optical lens object is placed generally in the middle of the optical lens representation template 30 and its outlying shape traced 32 in the generally centralized area utilizing the optical lens tracing pen 31. An approximation of the centralized area of the optical lens representation template 30 is facilitated by the intersection of first and second axis indicators 33 and 36.

Said indicators 33 and 26 are pre-printed on said optical lens representation template 30 and are presented as a color value distinct from that indicated by the tracing lines resulting from the representation of said optical lens object 32 on the optical lens representation template 30. In the invention's preferred embodiment, first 33 and second 36 colored axis indicators are manifested as the color value "yellow" while the traced representation of the optical lens object 32 is represented as a color value distinguishable from said first 33 and second axis 36 color value. In the preferred embodiment, said tracing 32 is manifested as the color "blue". The optical lens tracing pen 31 is of distinct design, provides for unique operational characteristics, and will be discussed in detail in association with FIG. 12. Once the optical lens object is represented on the optical lens object template 30, the template 30 is inserted into a computer scanner 13 resulting in the scanned image being stored digitally with attendant color threshold values red, blue and green to a computer readable memory or file structure. Said scanned image is then retrieved utilizing first software 20 executing within the client CPU 10. Said retrieval of said image is facilitated by Windows TWAIN protocols with said protocols known, utilized and practiced by those skilled in the art. Having retrieved said scanned image, the invention next derives optical lens axis coordinates from the retrieved image. This process is more particularly discussed and disclosed in association with FIGS. 3 and 4.

Figure 3:
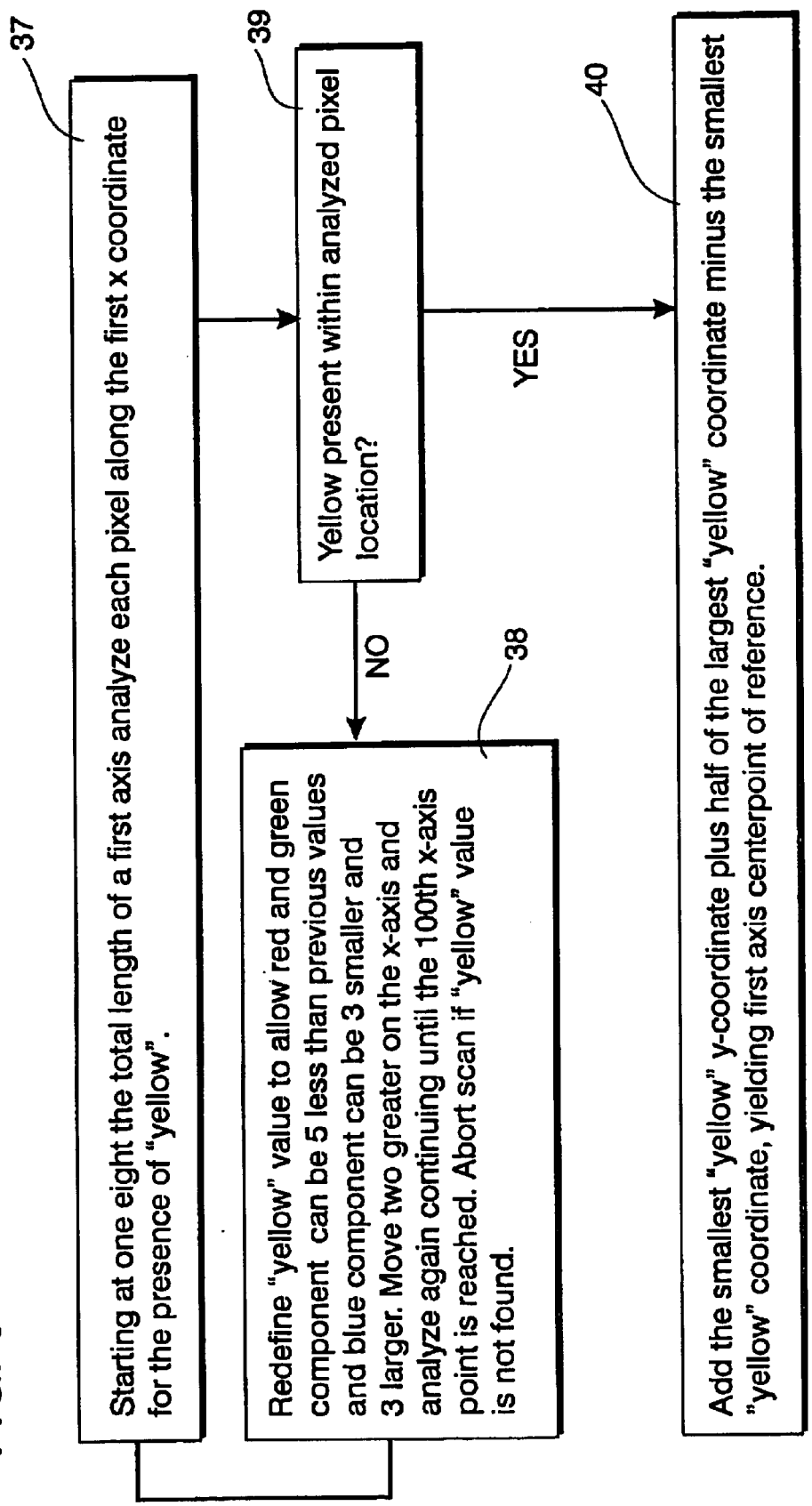
FIG. 3 is a high level logic flow diagram of a software code segment for determining a scanned image first axis center point of reference as practiced in the invention's preferred embodiment.

FIG. 3 illustrates high level process steps associated with a software code segment instruction set for determining a scanned image first axis center point of reference as practiced in the invention's preferred embodiment. When determining the scanned image first axis center point of reference, the invention first analyzes each horizontally aligned pixel along said scanned image first axis for the presence of a pixel color value meeting a pre-defined color value requirement. As practiced in the invention's preferred embodiment, said pixels are analyzed for the presence of the color yellow. As known to those skilled in the art, scanned colored images are stored and internally represented as numeric values associated with the colors Red, Blue and Green values. Consequently the invention's preferred embodiment scans each pixel analyzing each pixel for the color yellow. Such yellow presence is evaluated by determining that the analyzed pixel color is not white, that the pixels Red value is greater than 200 on a scale of 0 through 255, that the pixels Green value is greater than 200 on a scale of 0 through 255 and that the pixels Blue value is greater than 50 but less than 200 with respect to said color value scale. Should the analyzed pixel prove negative for the presence of the color yellow, the invention modifies the vertical location of the scanned image's first axis and analyzes each horizontally aligned pixel along the newly modified first axis location. Though the present invention's preferred embodiment searches for the value of yellow, any color value distinguishable from the color value represented in the optical lens object tracing may be used for such color distinction. Upon identifying the presence of the color yellow in an analyzed pixel, the invention continues to analyze the next non-analyzed horizontally aligned pixel and stores the beginning and ending locations of said horizontally aligned pixels, meeting the (yellow) color value requirement along said modified first axis location. Should the modified axis location fail to yield a color value, meeting the afore stated color requirement, the above noted process is repeated again and each pixel analyzed along the next modified first axis location and "yellow" tolerance definition is redefined to reflect a broader range of definition. The process for determining a scanned image second axis center point of reference is noted and defined in association with FIG. 4.

Figure 4:
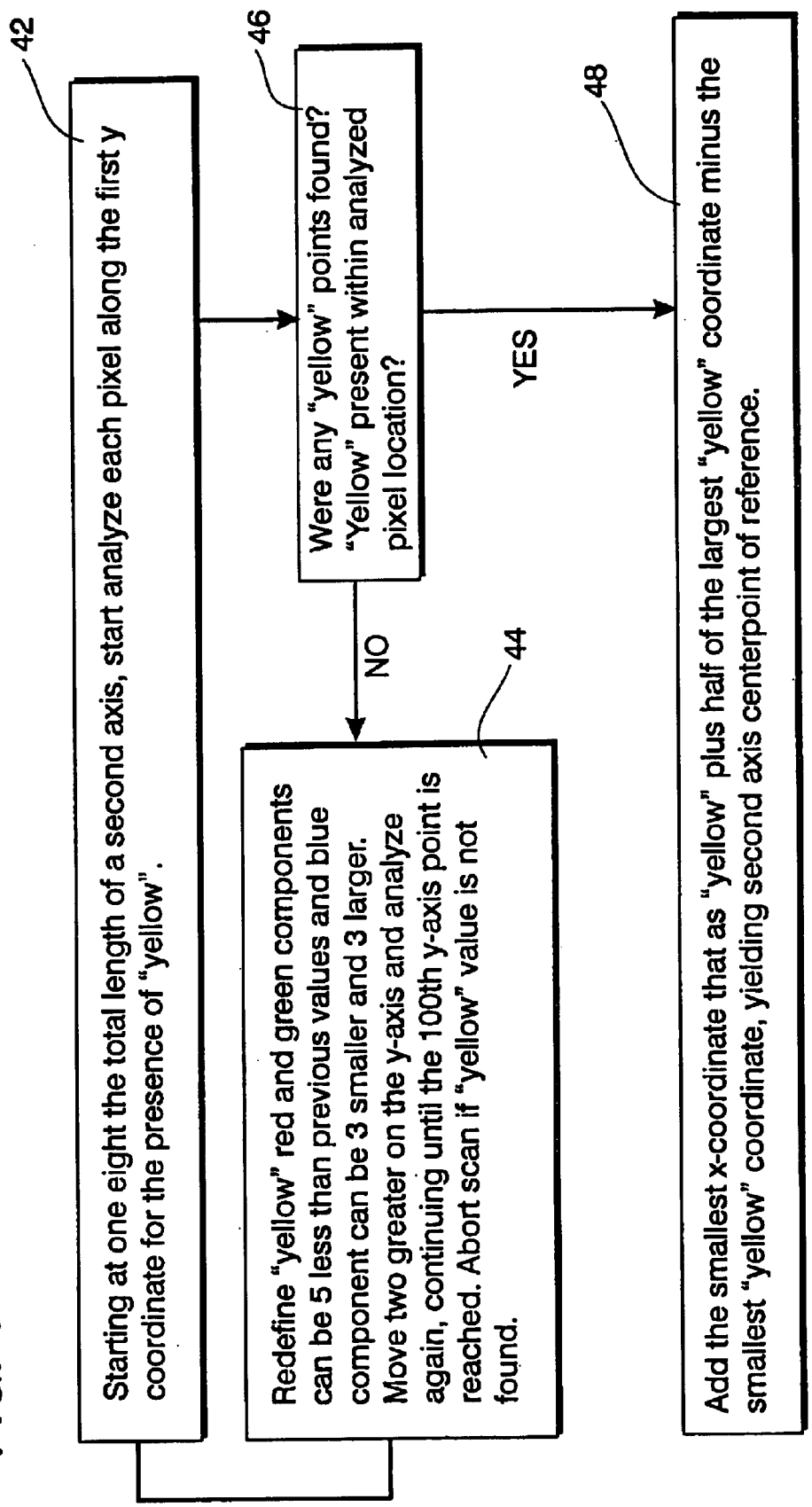
FIG. 4 is a high level logic flow diagram of a software code segment for determining a scanned image second axis center point of reference as practiced in the invention's preferred embodiment.

FIG. 4 illustrates high level process steps associated with a software code segment instruction set for determining a scanned image second axis center point of reference as practiced in the invention's preferred embodiment. When determining the scanned image second axis center point of reference, the invention first analyzes each vertically aligned pixel along said scanned image second axis for the presence of a pixel color value meeting a pre-defined color value requirement. As practiced in the invention's preferred embodiment, said pixels are analyzed for the presence of the color yellow. Consequently the invention's preferred embodiment analyzes each vertically aligned pixel for presence of the color yellow. Such yellow presence is evaluated by determining that the analyzed pixel color is not white, that the pixels Red value is greater than 200 on a scale of 0 through 255, that the pixels Green value is greater than 200 on a scale of 0 through 255 and that the pixels Blue value is greater than 50 but less than 200 with respect to said color value scale. Should the analyzed pixel prove negative for the presence of the color yellow, the invention modifies the horizontal location of the scanned image's second axis and analyzes each vertically aligned pixel along the newly modified second axis location. Though the present invention's preferred embodiment searches for the value of yellow, any color value distinguishable from the color value represented in the optical lens object tracing may be used for such color distinction. Upon identifying the presence of the color yellow in an analyzed pixel, the invention continues to analyze the next non-analyzed vertically aligned pixel and stores the beginning and ending locations of said vertically aligned pixels, meeting the (yellow) color value requirement along said modified second axis location. Should the modified axis location fail to yield a color value, meeting the afore stated color requirement, the above noted process is repeated again and each pixel analyzed along the next modified second axis location.

For purposes of a full and enabling disclosure in association with FIGS. 3 and 4, a source code instruction set as practiced in the invention's preferred embodiment is herein immediately provided.

---

Determining Scanned Image First Axis Centerpoint of Reference

```
int yellow_r=200, yellow_g=200, yellow_b1=50, yellow_b2=200;
x=0;
ReTryHoriz:
x+=2;
smallc=bmp.bmHeight,bigc=0;
for(y=bmp.bmHeight/8;y<bmp.bmHeight-bmp.bmHeight/8;y++)
    {
        GiveMeSome( );
        c=GetPixel(mDC,x,y);
        if(c!=white && GetRValue(c)>yellow_r &&
        GetGValue(c)>yellow_g && GetBValue(c)>yellow_b1 &&
        GetBValue(c)<yellow_b2)
            {
                if(y<smallc)
                    smallc=y;
                if(y>bigc)
                    bigc=y;
            }
    }
if(smallc==bmp.bmHeight && bigc==0 && x<100)
    {
        yellow_r-=5;
        yellow_g-=5;
        yellow_b1-=3;
        yellow_b2+=3;
        goto ReTryHoriz;
    }
if(smallc==bmp.bmHeight && bigc==0)
    {
        char str[100];
        SelectObject(mDC,old);
        DeleteObject(MyBmp);
        DeleteDC(mDC);
        x=bmp.bmWidth;
        y=bmp.bmHeight;
        sprintf(str,"Can't find horiz grid, please
        check prescan area(%lu,%lu).",x,y);
        MessageBox(hDlg,str,maintitle,MB_OK | MB_ICONSTOP);
        PostQuitMessage(FALSE);
        EndDialog(hDlg,FALSE);
```

-continued

```
        return(FALSE);
    }
gridy=smallc+(bigc-smallc)/2;
```

Determining Scanned Image Second Axis Centerpoint of Reference

```
int yellow_r=200,yellow_g=200,yellow_b1=50,yellow_b2=200;
y=0;
ReTryVert:
y+=2;
smallc=bmp.bmWidth,bigc=0;
for(x=bmp.bmWidth/8;x<bmp.bmWidth-bmp.bmWidth/8;x++)
    {
        GiveMeSome( );
        c=GetPixel(mDC,x,y);
        if(c!=white && GetRValue(c)>yellow_r &&
        GetGValue(c)>yellow_g && GetBValue(c)>yellow_b1 &&
        GetBValue(c)<yellow_b2)
            {
                if(x<smallc)
                    smallc=x;
                if(x>bigc)
                    bigc=x;
            }
    }
if(smallc==bmp.bmWidth && bigc==0 && y<100)
    {
        yellow_r-=5;
        yellow_g-=5;
        yellow_b1-=3;
        yellow_b2+=3;
        goto ReTryVert;
    }
if(smallc==bmp.bmWidth && bigc==0)
    {
        char str[200];
        SelectObject(mDC,old);
        DeleteObject(MyBmp);
        DeleteDC(mDC);
        x=bmp.bmWidth;
        y=bmp.bmHeight;
        sprintf(str,"Can't find vertical grid, please check
        prescan area(%lu-%u,%u)",gridy,x,y);
        MessageBox(hDlg,str,maintitle,MB_OK | MB_ICONSTOP);
        PostQuitMessage(FALSE);
        EndDialog(hDlg,FALSE);
        return(FALSE);
    }
gridx=smallc+(bigc-smallc)/2;
```

---

Figure 5:
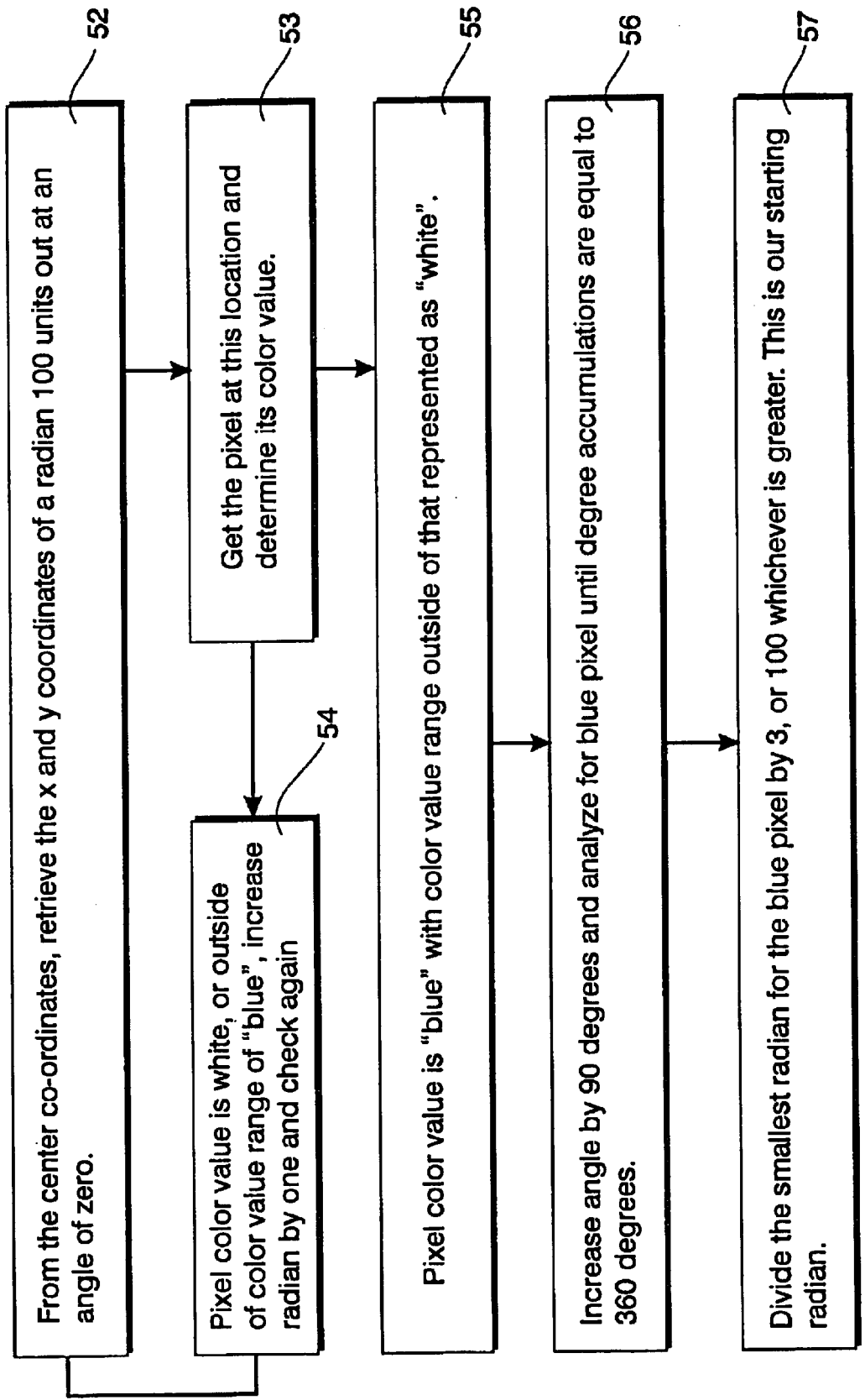
FIG. 5 is a high level logic flow diagram of a software code segment for determining a starting radius as practiced in the invention's preferred embodiment.

The invention next derives a starting radian based upon optical lens center coordinates and discloses this derivation process in association with FIG. 5.

As can be seen in FIG. 5, to determine a starting radius from the derived center coordinates, first and second axis coordinates of a radian 100 units out at an angle of 0 are first retrieved 52. Though the invention's preferred embodiment utilizes a starting value of '100', a greater or lesser increment may be specified. A pixel at the retrieved location is then analyzed to determine its color value 53. If said pixel is determined to be white, or not blue, the radian location is increased by one 54 and the verification process repeated 52 at the revised location. If the pixel is blue but not white 55, the angle is increased by 90° at the revised location and checked e presence of a blue pixel again 56. This process is repeated until such time as increased angle accumulations equal 360° 56. Upon reaching said 360° accumulation value, the smallest radian for a blue pixel is divided by 3 or 100 whichever is greater, yielding the starting radian 57.

For purposes of a full and enabling disclosure in association with FIG. 5, a starting radius code instruction set as practiced in the invention's preferred embodiment for determining a starting radius is herein immediately provided.

Determining A Starting Radius

```
BOOL bluecheck(COLORREF c)
{
    if((unsigned char)GetRValue(c)<(unsigned
char)185 && (unsigned char)GetGValue(c)<(unsigned
char)185 && (unsigned char)GetBValue(c)>(unsigned char)50)
        return (TRUE);
    return(FALSE);
}
if(bmp.bmHeight>bmp.bmWidth)
{
    if(bmp.bmHeight>3300) // 600dpi, 5.5 inches
        bmp.bmHeight=bmp.bmWidth;
    g=bmp.bmHeight;
}
else
{
    if(bmp.bmWidth>3300) // 600dpi, 5.5 inches
        bmp.bmWidth=bmp.bmHeight;
    g=bmp.bmWidth;
}
bigc2=bigc=0;
smallc2=smallc=g;
//////////
startmeoff=g;
for(x=0;x<512;x+=128)
{
    double r;
    long int myx,myy;
    GiveMeSome( );
    c=white;
    for(r=100;r<g && (c==white || !bluecheck(c));r++)
    {
        myx=(int)((double)gridx+(double)MySin(x)*r);
        myy=(int)((double)gridy+(double)MyCos(x)*r);
        c=GetPixel(mDC,myx,myy);
        GiveMeSome( );
    }
    GiveMeSome( );
    if(r<startmeoff)
        startmeoff=r;
}
if(startmeoff>=g)
    startmeoff=100;
else
{
    startmeoff=(long)fabs(startmeoff/3);
    if(startmeoff<100)
        startmeoff=100;
}
```

Figure 6:
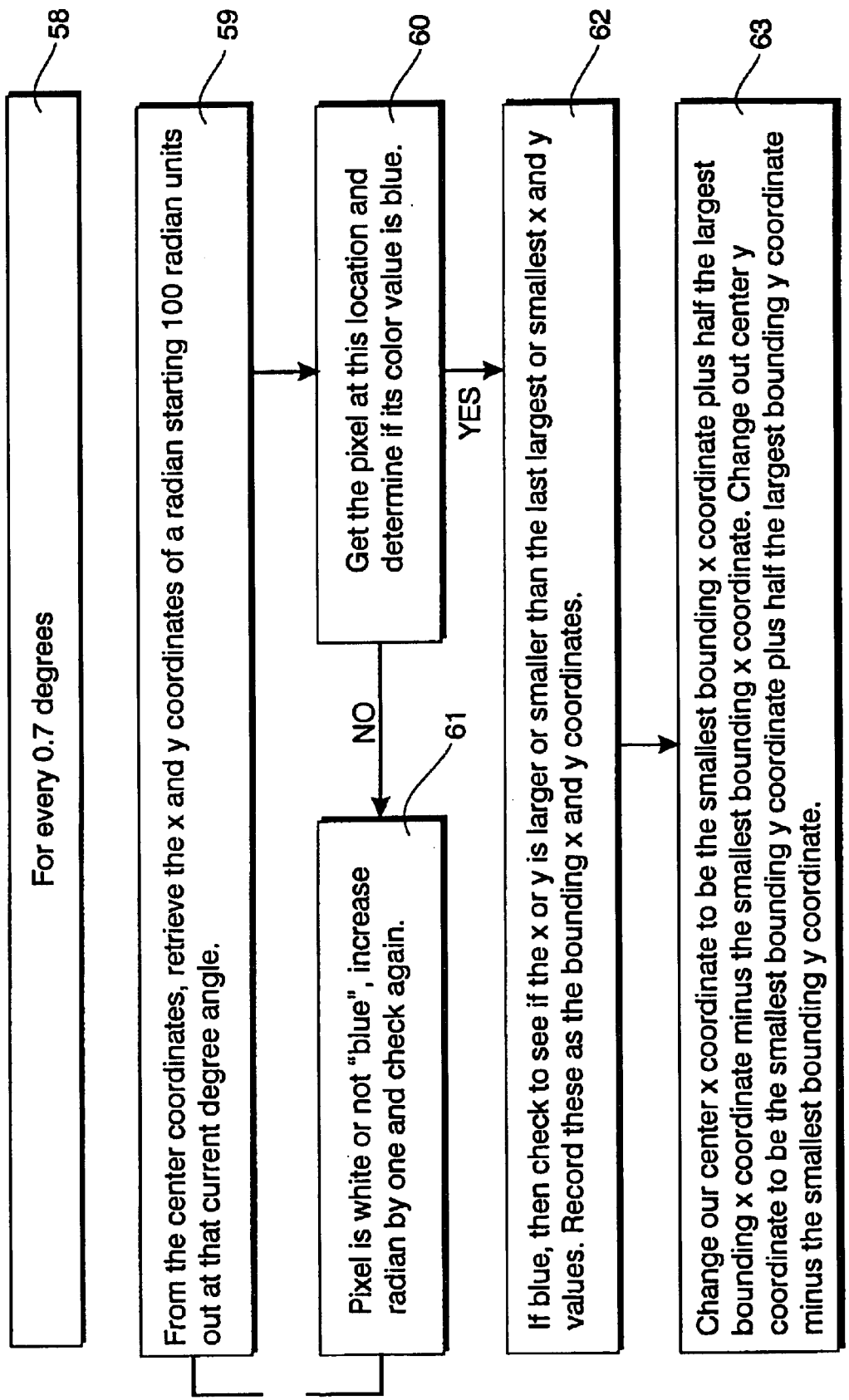
FIG. 6 is a high level logic flow diagram of a software code segment centering the scanned image shape as practiced in the invention's preferred embodiment.

FIG. 6 illustrates the process by which the invention's preferred embodiment centers the retrieved scanned lens object image. Occurring at an interval of every 0.7°, the invention retrieves first and second coordinates of a radian, starting with 100 radian units out at the current degree angle 59, utilizing the technique and radial length as discussed in association with FIG. 5's starting radius determination. A pixel located at this location then analyzed for its color value 60 and if either white, or not blue, the radian is increased by one and the new pixel location is analyzed again 61. If the pixel at the analyzed location is blue, the invention determines if the first or second coordinates is larger or smaller than the last largest or smallest first and second coordinate values. If the determination proves positive the new first and second coordinates are recorded as the bounding first and second coordinate values. The first axis center coordinate value is then modified and stored as the smallest bounding first axis coordinate value plus 0.50 of the largest bounding first axis coordinate minus the smallest bounding first axis coordinate. The center second axis center coordinate value is modified to be the smallest bounding coordinate value plus 0.50 of the largest bounding second axis coordinate minus the smallest bounding second coordinate 63. Said computations resulting in the centering of said retrieved scanned lens object image.

For purposes of a full and enabling disclosure in association with FIG. 6, a centering of retrieved shape source code instruction set as practiced in the invention's preferred embodiment is herein immediately provided.

Centering a Scanned Image Shape

```
for(x=0;x<MYPOINTS+1;x++)
{
    double r;
    long int myx,myy;
    double rads=X;
    c=white;
    for(r=startmeoff;r<g && (c==white ||
    !bluecheck(c));r++) // our radius
    {
        GiveMeSome( );
        if(reverseclick==0)
            myx=(int)((double)gridx-(double)MySin(rads)*r);
        else
            myx=(int)((double)gridx+(double)MySin(rads)*r);
        myy=(int)((double)gridy+(double)MyCos(rads)*r);
        c=GetPixel(mDC,myx,myy);
    }
    if(r>=g) // means it's the max value.
    {
        char str[200];
        SelectObject(mDC,old);
        DeleteObject(MyBmp);
        DeleteDC(mDC);
        sprintf(str,"No tracing found(%lu), please
            verify that your prescan region is correct
            and that the tracing was done using an
            approved e.lens pen.",x);
        MessageBox(hDlg,str,maintitle,MB_OK |
            MB_ICONSTOP);
        PostQuitMessage(FALSE);
        EndDialog(hDlg,FALSE);
        return(FALSE);
    }
    if(myx>bigc)
        bigc=myx;
    if(myx<smallc)
        smallc=myx;
    if(myy>bigc2)
        bigc2=myy;
    if(myy<smallc2)
        smallc2=myy;
    sprintf(instring,"%u",40+30*x/MYPOINTS);
    SetDlgItemText(hDlg,BAR_CLICK,instring);
    InvalidateRgn(GetDlgItem(hDlg,BAR_CLICK),NULL,TRUE);
    GiveMeSome( );
}
gridx=smallc+(bigc-smallc)/2;
gridy=smallc2+(bigc2-smallc2)/2;
```

Figure 7:
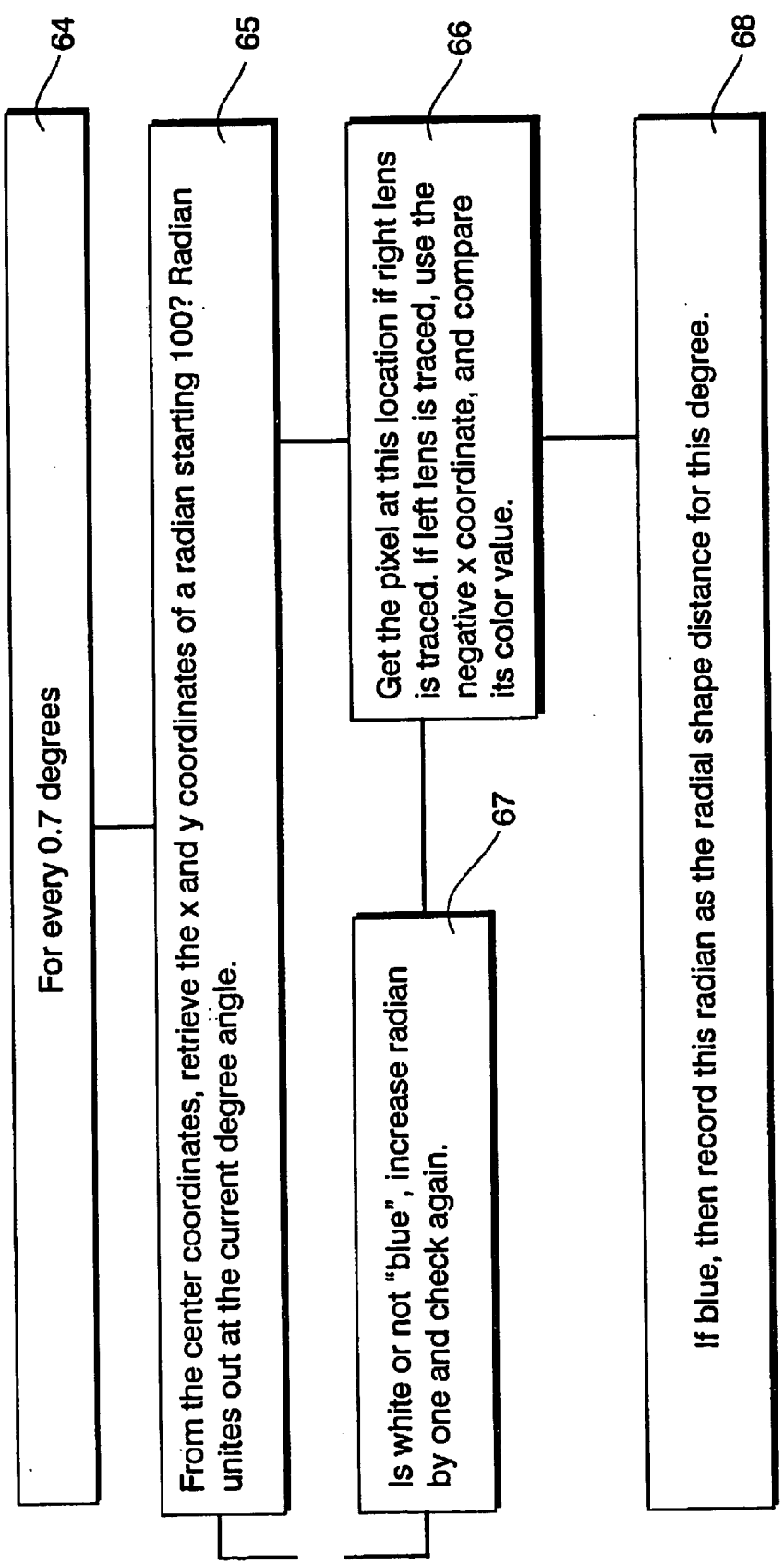
FIG. 7 is a high level logic flow diagram of a software code segment for determining the scanned image's radial shape as practiced in the invention's preferred embodiment.

The invention next determines the radial shape of the scanned object lens image as disclosed in association with FIG. 7, turning now to FIG. 7.

In FIG. 7, the preferred invention, for an interval of every 0.7° from the center axis coordinates 64, first and second axis coordinates having a radian starting 100 radian units out of the current degree angle are retrieved 65. Analysis of a pixel at this location determines if the right lens has been traced. If a left lens has been traced, the negative first axis coordinate is compared for its color value 66. If the pixel at this location is white or not blue, the radian is increased by one and the analyzation process is repeated again 67. If the pixel at that location is blue, the radian is then recorded as the radian shape distance for this particular degree 68.

Figure 8:
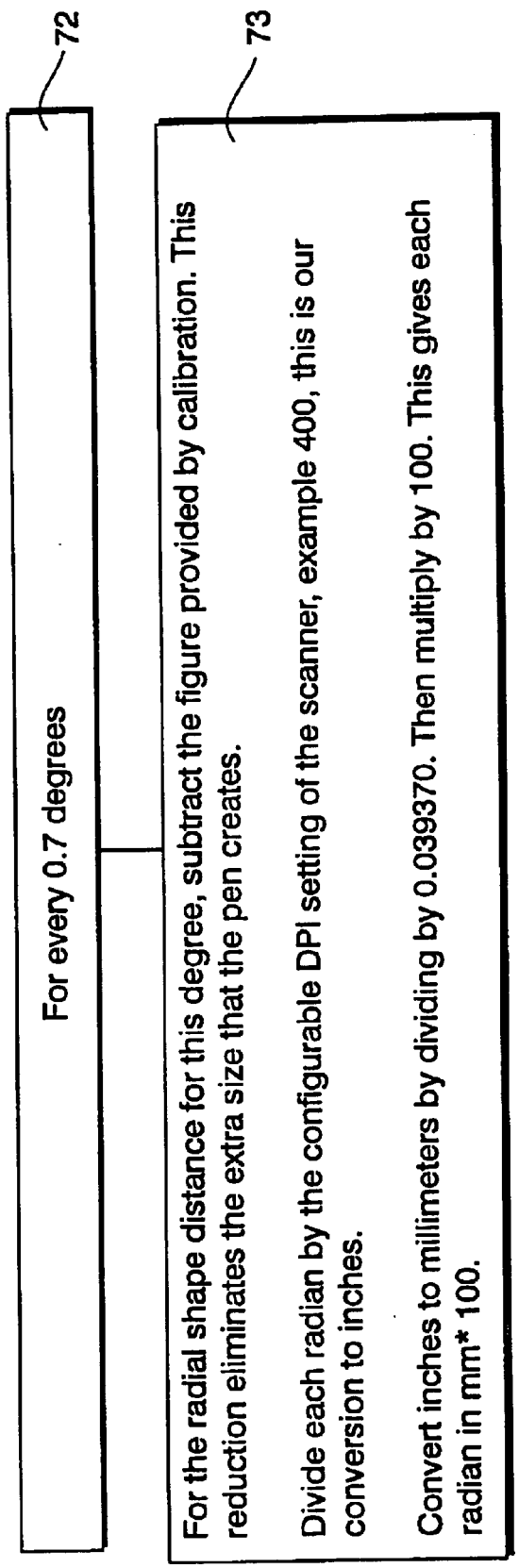
FIG. 8 is a high level logic flow diagram of a software code segment for determining the radial size of the scanned image radial size as practiced in the invention's preferred embodiment.

For purposes of a full and enabling disclosure in association with FIG. 8, a source code for determining radial shape instruction set as practiced in the invention's preferred embodiment is herein immediately provided.

---
Determining a Scanned Image Radial Shape
---
```
elens.jobdata_datasize=0;
for(x=0;x<MYPOINTS+1;x++)
    {
    double r;
    lonq int myx,myy;
    double rads=x;
    c=white;
    for(r=startmeoff;r<g && (c==white || !bluecheck(c));r++)
        {
        GiveMeSomne( );
        if(reverseclick==0)
myx=(int)((double)gridx-(double)MySin(rads)*r);
        else
myx=(int)((double)gridx+(double)MySin(rads)*r);
myy=(int)((double)gridy+(double)MyCos(rads)*r);
        c=GetPixel(mDC,myx,myy);
        }
    myx=(int)r;
    if(myx<1)
        myx=1;
    elens.jobdata_datasize++;
```
---

The invention next determines the radial size of the scanned and retrieved optical lens object as disclosed in association with FIG. 8. Though the invention in association with FIGS. 6, 7, 8 and 9 use an analysis interval increment of 0.7°, it will become readily apparent to those skilled in the art, that other intervals may be used. However, it is found through extensive testing that in inventions preferred embodiment said interval of 0.7° yields the most specific and exact results for yielding accurate traced lens object representation data.

In FIG. 8 the calculated radial shape size is determined. For every 0.7°, a figure provided by calibration for the radial shape distance for this degree is subtracted to eliminate the extra size that the tracing pen creates. Each radian is then divided by the configurable DPI setting of the scanner and, if required, an inches to millimeters conversion is executed 73, yielding a radian result in millimeters times 100. The present invention then provides a process for smoothing the said derived radial shape and is disclosed in association with FIG. 9.

For purposes of a full and enabling disclosure in association with FIG. 8, a source code to get radial size instruction set as practiced in the invention's preferred embodiment is herein immediately provided.

analysis yields a positive result, the invention next tests to see if the size of the degree 0.7° below the current location, less the size of the degree 1.4° below the current location or the size of the degree 0.7° below the current location is bigger than the size of the current degree 84. If the result of that analyses is positive, the size of the degrees 0.7° below the current degree is modified to be the size of the degree 1.4° plus half the size of the current degree minus the size of the degree occurring 1.4° below 85.

Figure 9:
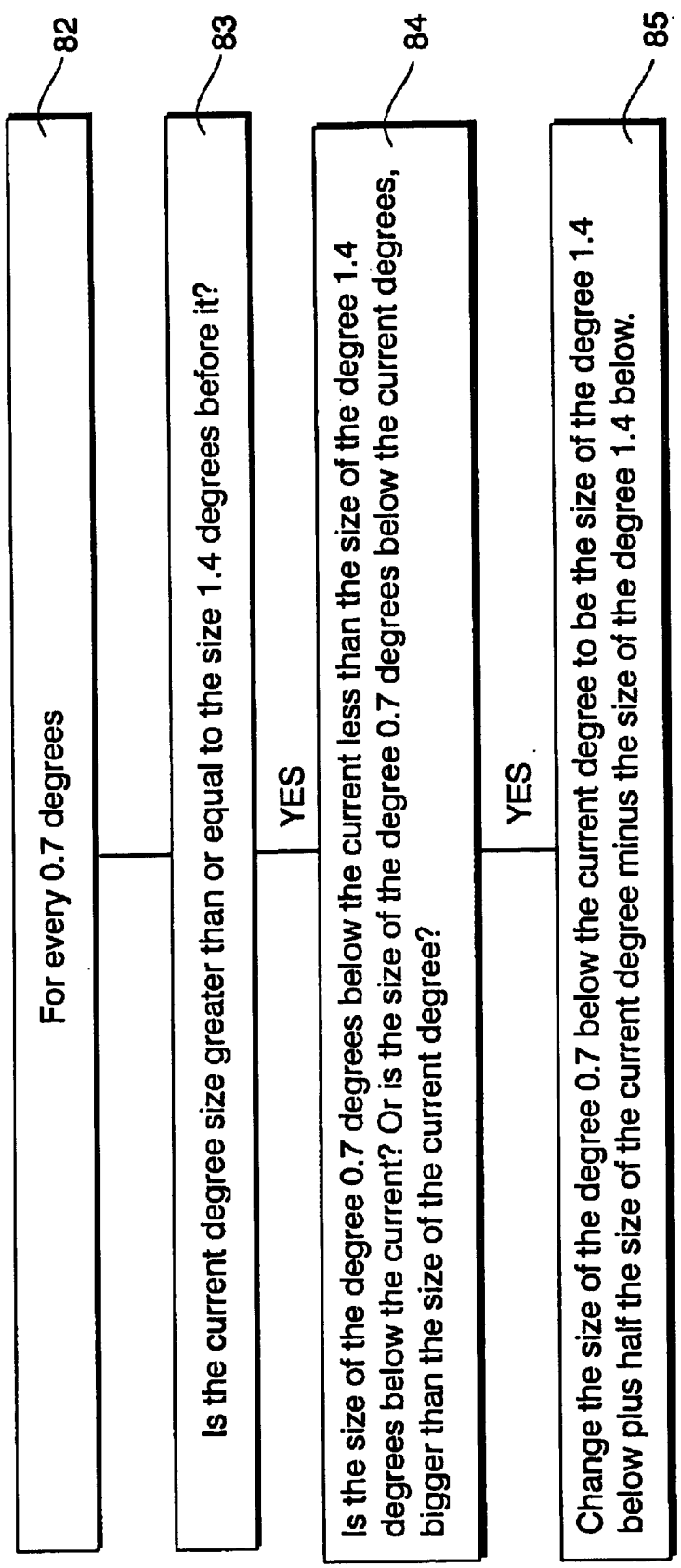
FIG. 9 is a high level logic flow diagram of a software code segment for smoothing the radial shape derived in association with FIG. 7.

For purposes of a full and enabling disclosure in association with FIG. 9, a source code statement for smooth shape instruction set as practiced in the invention's preferred embodiment is herein immediately provided.

---
Smoothing a Scanned Image Radial Shape
---
```
for(x=0;x<MYPOINTS+1;x++)(
    if(config.makesmooth==1 && x>2)
        {
        if(elens.shape[x]<elens.shape[x-2])
            {
            if(elens.shape[x-1]<elens.shape[x-2] ||
            elens.shape[x-1]>elens.shape[x])
                elens.shape[x-1]=(short
                int)(elens.shape[x-2]+(elens.shape[x
                ]-elens.shape[x-2])/2);
            }
        }
    }
```
---

The invention additionally provides for the capability by which the representation of the derived shapes may be modified both in terms of modifying the size of said derived radial shapes as well as rotating the representation of said shapes. The processes for rotation and modification are discussed and disclosed in association with FIGS. 10 and 11.

Figure 10:
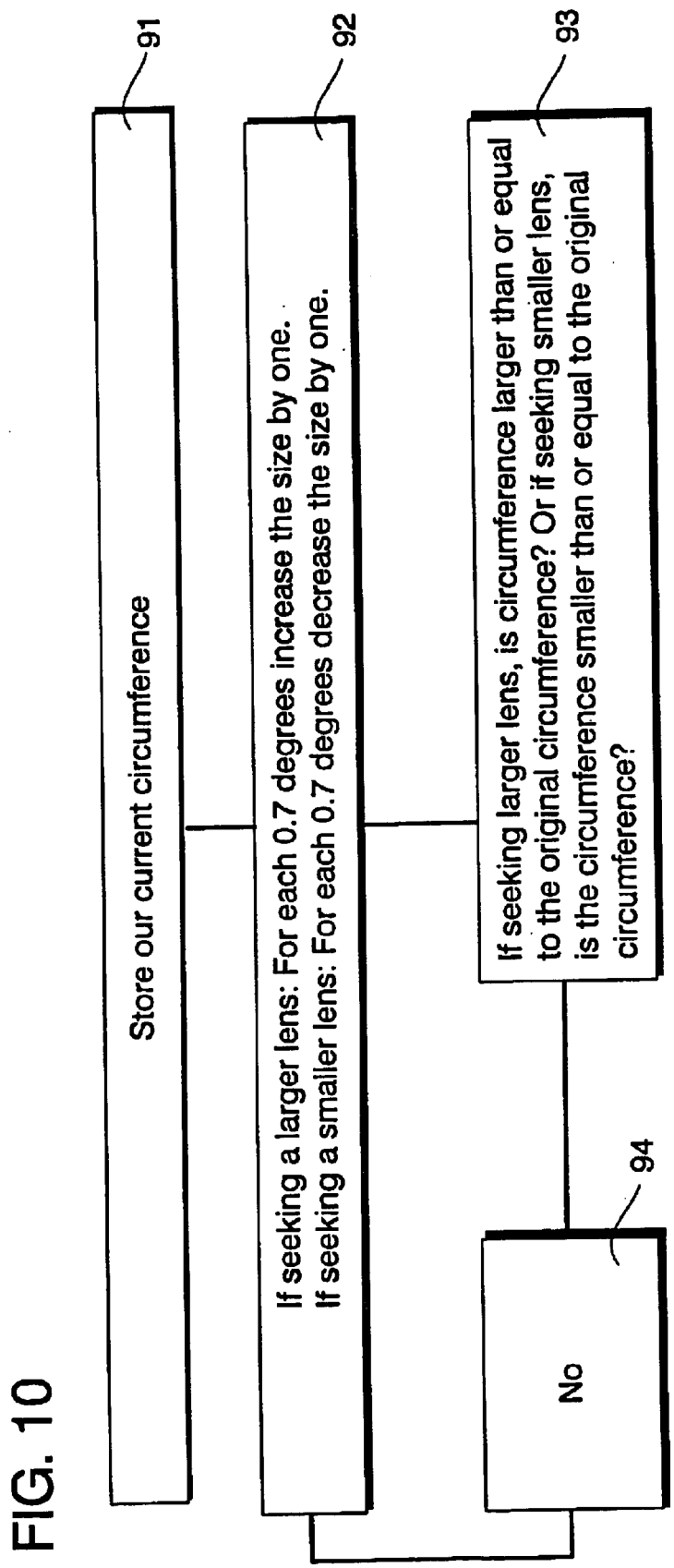
FIG. 10 is a high level logic flow diagram of a software code segment for modifying the size of the derived radial shape as practiced in the invention's preferred embodiment.

Turning now to FIG. 10, to modify the size of the retrieved and derived radial shape, the invention first stores the current circumference of said shape 91. If a larger lens is desired, for an interval of each 0.7°, is increased by 1. If seeking a smaller lens representation of the derived radial shape, for an interval of each 0.7°, the size is decreased by '1' 92. The invention next checks, if seeking a larger lens, if the circumference is larger than or equal to the original circumference or, if seeking a smaller lens, if the circumference is smaller than or equal to the original circumference 93. When seeking a larger lens, if the circumference is not larger than or equal to the original circumference, or if seeking a smaller lens, if the circumference is smaller than or equal to the original circumference 94, sizing and increasing processes are repeated 92.

---
Determining A Scanned Image Radial Size
---
```
for(x=0;x<MYPOINTS+1;x++) {
elens.shape[x]=(((double)myx/(double)config.resolution)/(double)0.039370)*(double)100;
elens.shape[x]=(unsigned short int)( (unsigned short int)((double)elens.shape[x]/(double)10)   * 10L
    +config.calibrate);
}
```
---

The invention further provides for the capability to smooth a scanned image radial shape. This capability is disclosed in association with FIG. 9. Turning now to FIG. 9.

Using the interval standard as elected for in the inventions preferred embodiment of 0.7° 82, the current degrees size is analyzed to determine if it is greater than or equal to the value occurring size 1.4° before its location 83. If such For purposes of a full and enabling disclosure in association with FIG. 10, a source code instruction set to modify size as practiced in the invention's preferred embodiment is herein immediately provided.

Modify Size of Derived Radial Shape

```
short int y;
short int num=1;
double val=CalcCircum( );
do
    {
    for(y=0;y<513;y++)
        {
        if(increasesize==1)
            elens.shape[y]=(short int)(original[y]+offset+num);
        else
            elens.shape[y]=(short int)(original[y]+offset-num);
        }
    ShapeToJob( );
    JobToShape( );
    num++;
    } while((increasesize==1 &&val>=CalcCircum( )) ||
        (increasesize==0 && val<=CalcCircum( ));
if(increasesize==1)
    offset=(short int)(offset+(num-1));
else
    offset=(short int)(offset-(num-1));
```

Figure 11:
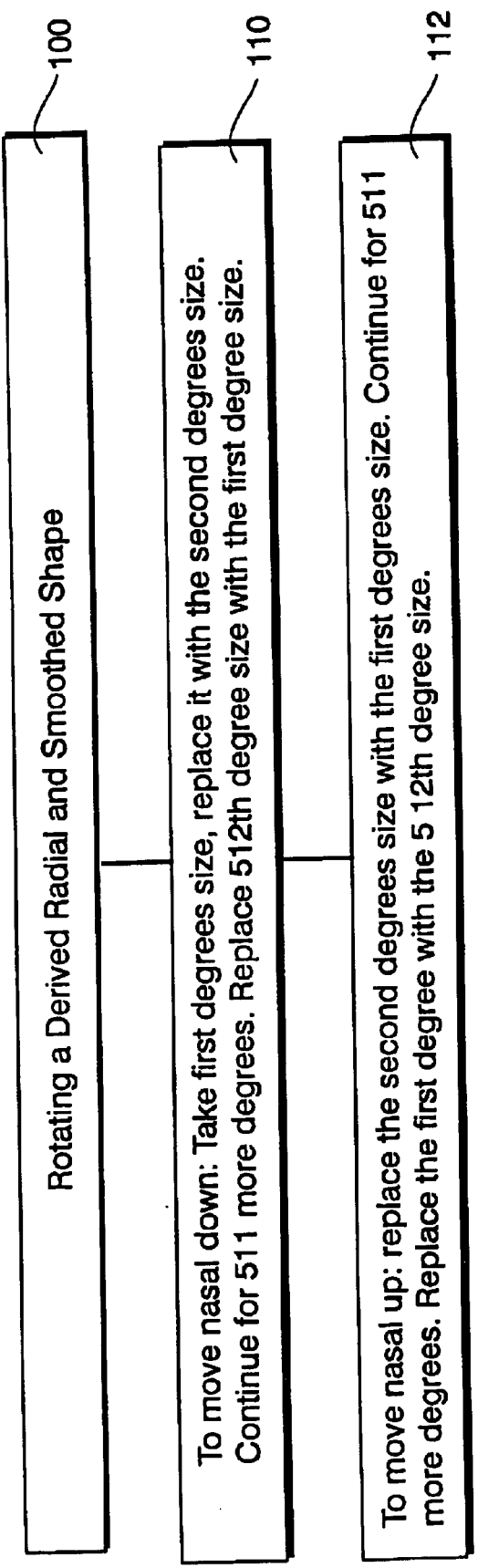
FIG. 11 is a high level logic flow diagram of a software code segment for rotating the derived radial and smoothed shape associated with FIGS. 1 and 9.

The method by which the presented object lens image may be rotated is discussed and disclosed in association with FIG. 11. Turning now to FIG. 11.

As disclosed in FIG. 11, to move the nasal portion of the representation downward, the invention takes a first degree size and replaces it with a second degree size and continues for 511 additional degrees replacing the 512$^{th}$ degree size with the first degree size 110. To move the representative image upward, the invention replaces the second degree size with the first degree size and continues for 511 more degrees replacing the first degree with the 512 degree size 112.

For purposes of a full and enabling disclosure in association with FIG. 11, a source code instruction set to modify rotation as practiced in the invention's preferred embodiment is herein immediately provided.

Rotating a Derived Radial and Smoothed Shape

```
if(nasalup==1)
    {
    short int a=original[0];
    for(y=0;y<elens.jobdata_datasize-1;y++)
        {
        short int b;
        b=original[y+1];
        original[y+1]=a;
        a=b;
        }
    original[0]=a;
    rotated--;
    }
else
    {
    short int a=original[0];
    for(y=0;y<elens.jobdata_datasize-1;y++)
        original[y]=original[y+1];
    original[y]=a;
    rotated++;
    }
```

Figure 12:
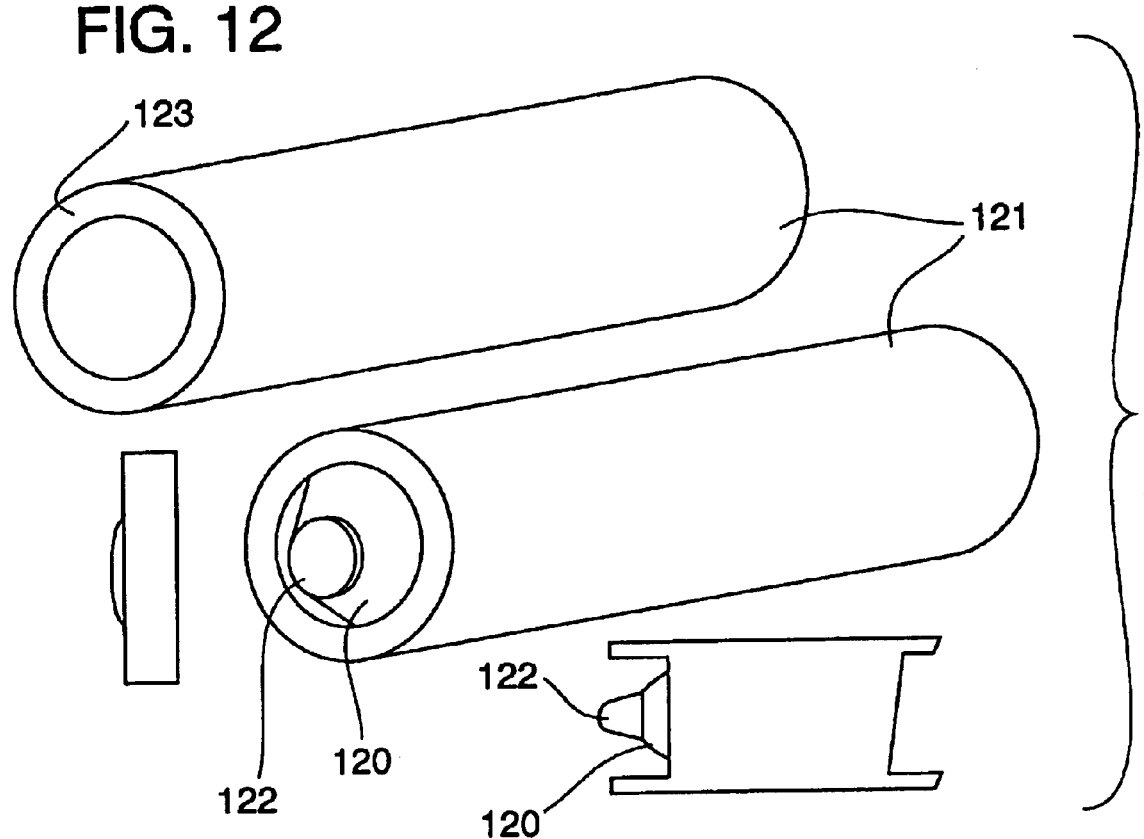
FIG. 12 is an illustration of the invention's preferred embodiment optical lens tracing pen.

Turning now to FIG. 12, FIG. 12 illustrates the optical lens tracing pen. The pen consists of a standard fine tipped ink pen refill 120 placed inside a cylinder with a near perfect circular shape 121 with a consistent diameter from the inking tip of the pen 122 to the outer edge of the cylinder 123. The pen's cylinder 121 is so positioned to prohibit the pen's inking tip 122 from marking, should a user of said pen attempt to utilize it at an angle beyond which accurate calibration could not be assured.

FIGS. 13 through 16 illustrate representative graphic user interfaces utilizing the association with the invention's preferred embodiment.

Figure 13:
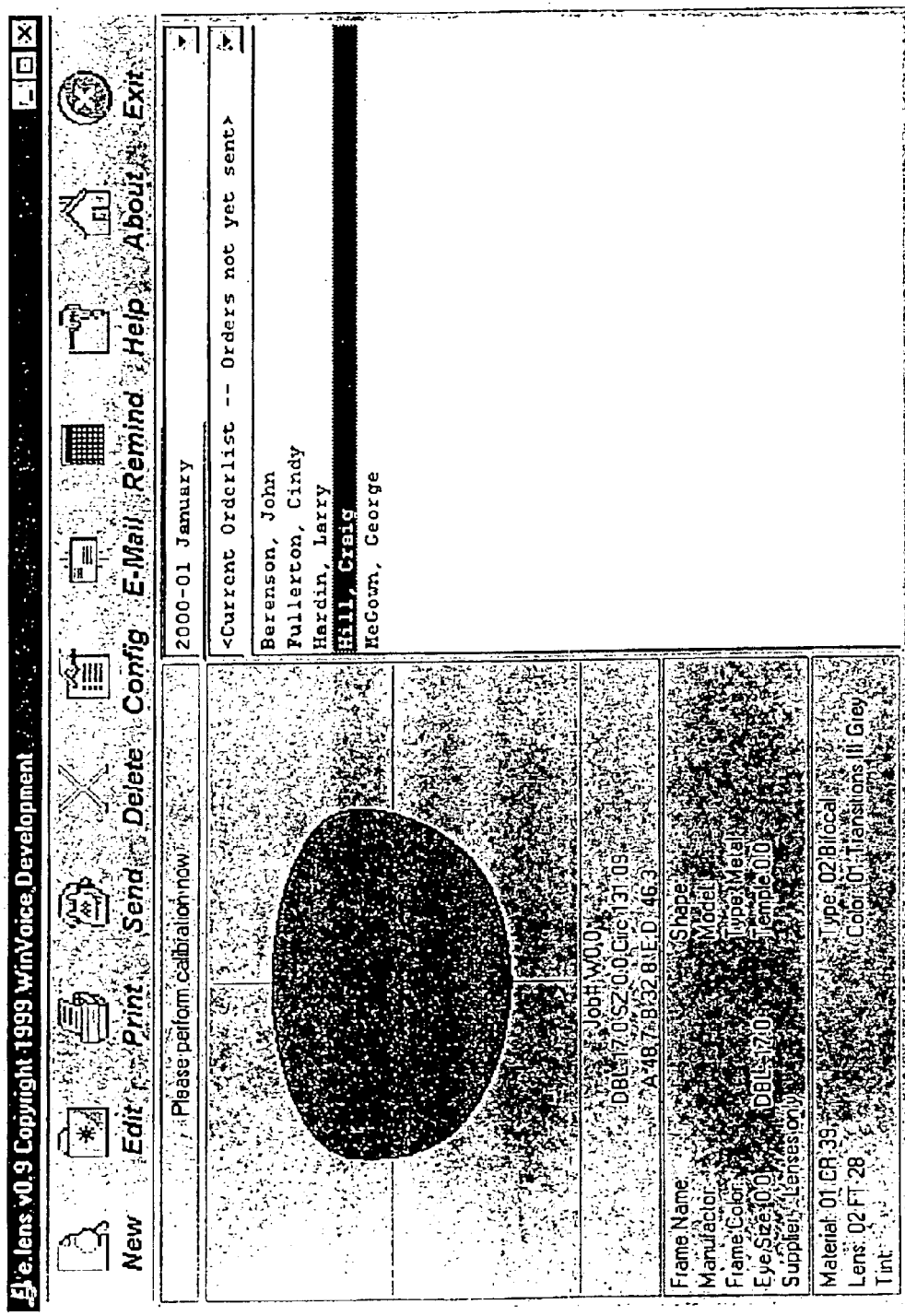
FIG. 13 is a representative screen image illustration of the invention's main screen graphic user interface as utilized in the invention's preferred embodiment.

FIG. 13 is a representative screen image illustration of the invention's main screen graphic user interface as utilized in the invention's preferred embodiment.

Figure 14:
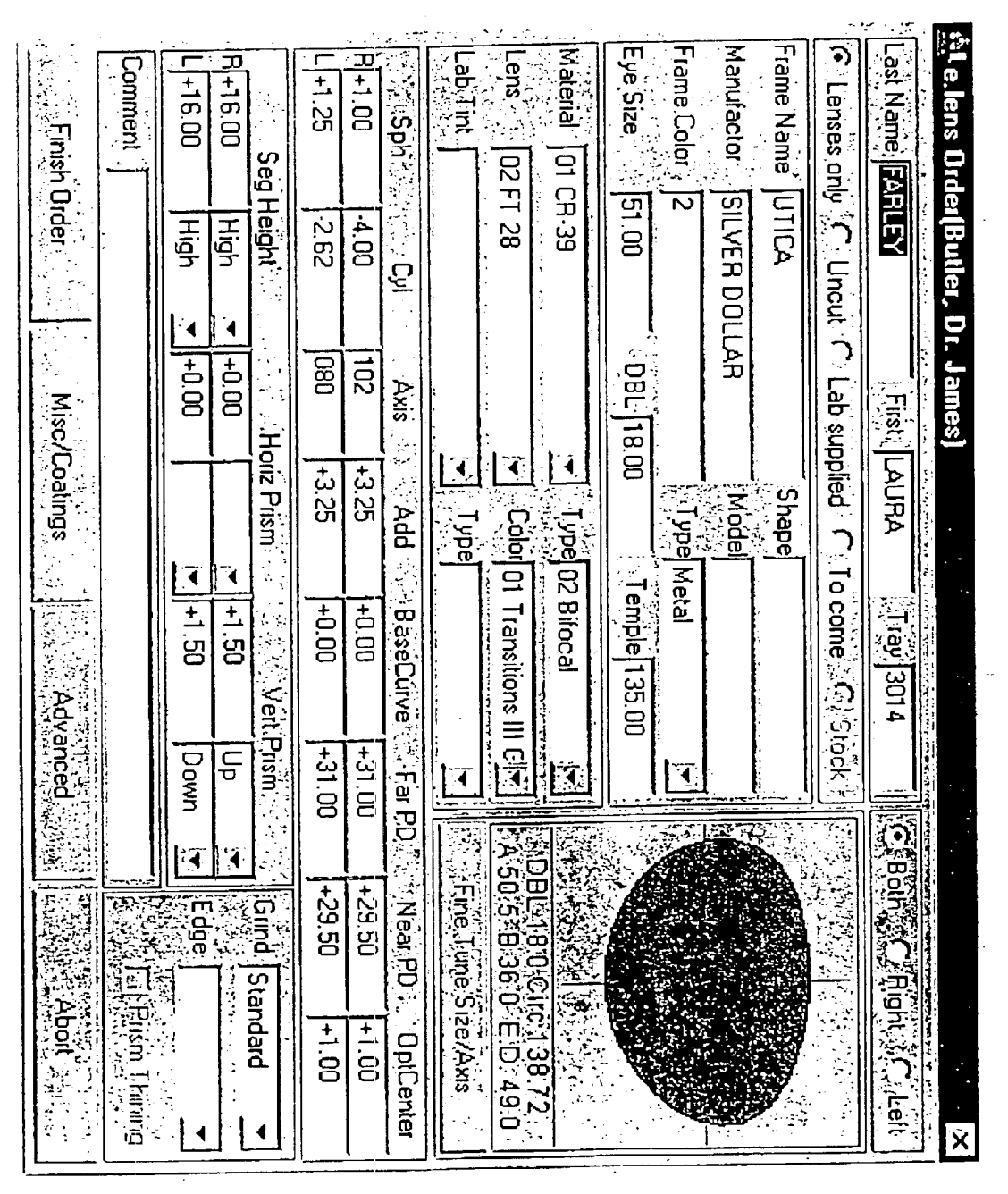

FIG. 14 is a representative screen image illustration of the invention's new order and edit screen as utilized in the invention's preferred embodiment.

Figure 15:
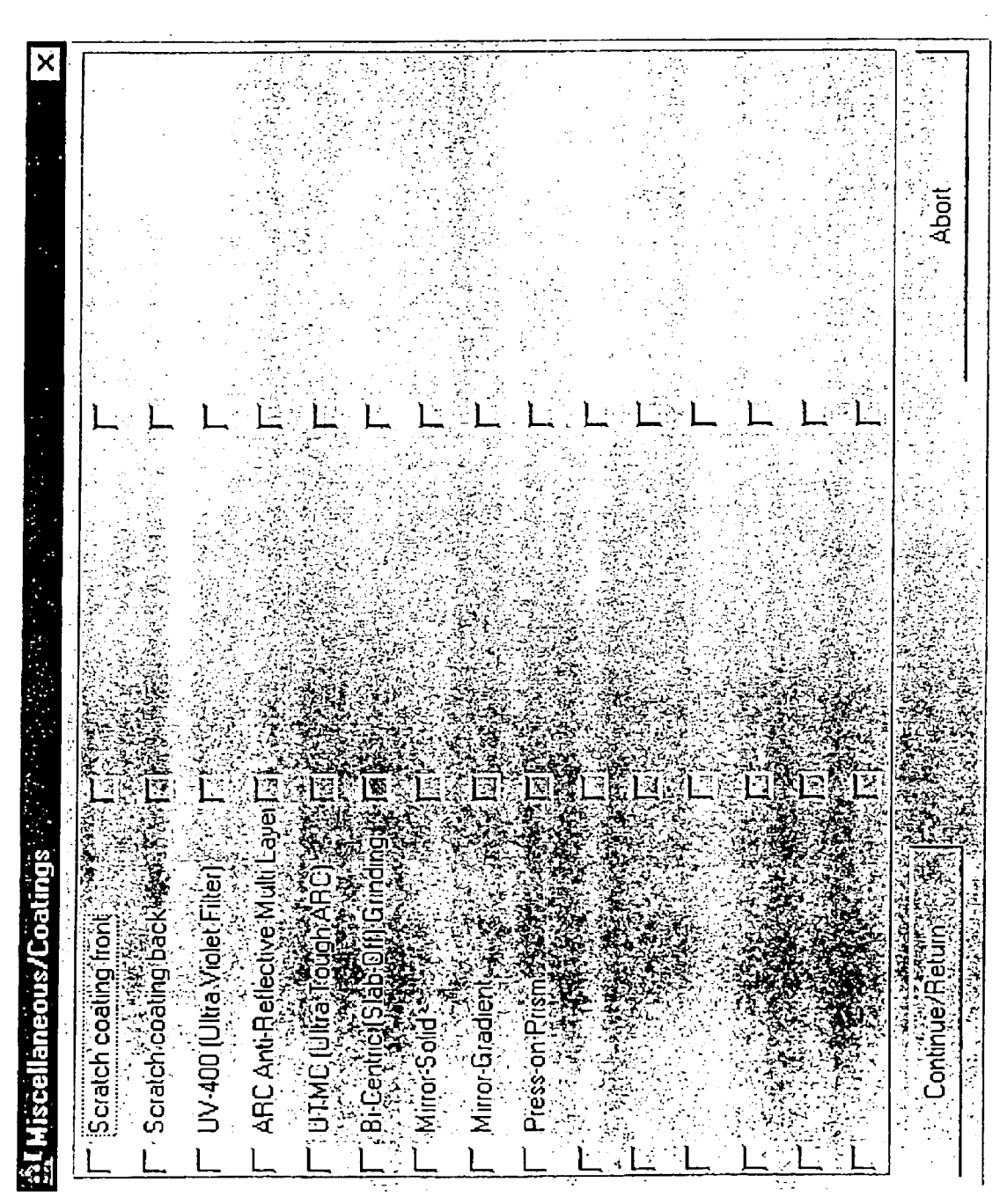

FIG. 15 is a representative screen image illustration of the invention's miscellaneous screen as utilized in the invention's preferred embodiment.

Figure 16:
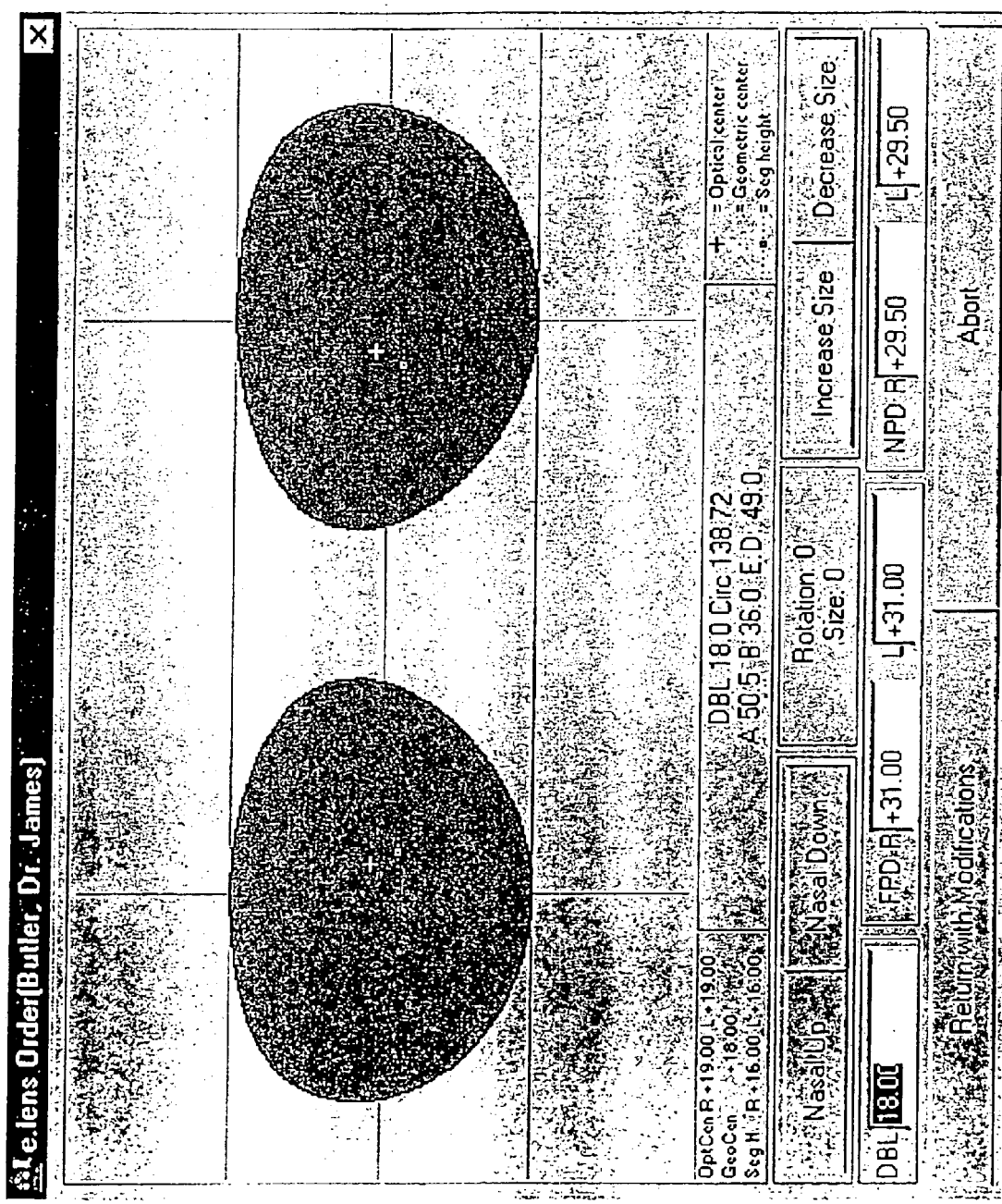
FIG. 16 is a representative screen image illustration of the invention's size modification and lens rotation screen as utilized in the invention's preferred embodiment.

FIG. 16 is a representative screen image illustration of the invention's size modification and lens rotation screen as utilized in the invention's preferred embodiment.

To provide for a clear understanding and enabling disclosure, a comprehensive source code listing of all instruction sets utilized by the invention's preferred embodiment is included as Appendix "A".

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

I claim:

1. A first computer program embodied on a computer-readable medium which adapts a client general purpose computer which determines and transmits optical lens sizing and prescription data comprising:

(a) a code segment for retrieving a stored image of a represented optical lens object;

(b) a code segment for deriving said optical lens object center coordinates from said stored image;

(c) a code segment for deriving a starting radian of said optical lens object center coordinates from said stored image;

(d) a code segment for centering a retrieved stored image;

(e) a code segment for deriving the radial shape of said optical lens object from said stored image;

(f) a code segment for deriving the size of said derived radial shape of said optical lens object from said stored image;

(g) a code segment for smoothing said derived radial shape;

(h) a code segment for identifying and retrieving patient related information from said scanned image;

(i) a code segment for transmitting said derived optical lens object radial shape, size, center and patient related information from a client central processing unit to a server general purpose computer, said server general purpose computer executing a second computer program which adapts the server general purpose computer to communicate with the client general purpose computer in response to said client computer's transmission of said derived optical lens object radial shape, size, center and patient related information.

2. The computer program of claim 1, further comprising:

(a) a code segment for modifying the size of said derived radial shape; and, (b) a code segment for altering and displaying a rotatable view of said derived radial and smoothed shape.

3. The computer program of claim 1 further comprising:

(a) a code segment for identifying and retrieving patient related information from scanned image.

4. A second computer program embodied on a computer-readable medium which adapts a server general purpose computer to communicate with a client general purpose computer in response to said client computer's transmission of optical lens sizing and prescription data, said client general purpose computer embodying and executing a first computer program which adapts the client general purpose computer to determine and transmit optical lens sizing and prescription data to said server general purpose computer, the first computer program comprising:

(a) a code segment for retrieving a stored image of a represented optical lens object;

(b) a code segment for deriving said optical lens object center coordinates from said stored image;

(c) a code segment for deriving a starting radian of said optical lens object center coordinates from said stored image;

(d) a code segment for centering a retrieved stored image;

(e) a code segment for deriving the radial shape of said optical lens object from said stored image;

(f) a code segment for deriving the size of said derived radial shape of said optical lens object from said stored image;

(g) a code segment for smoothing said derived radial shape;

(h) a code segment for identifying and retrieving patient related information from said scanned image;

(i) a code segment for transmitting said derived optical lens object radial shape, size, center and patient related information from a client central processing unit to a server general purpose computer, said server general purpose computer executing a second computer program which adapts the server general purpose computer to communicate with the client general purpose computer in response to said client computer's transmission of said derived optical lens object radial shape, size, center and patient related information.

5. The second computer program of claim 4 further comprising the transmission of client directed information from said server central processing unit to said client central processing unit.

6. The computer program of claim 4 further comprising the transmission of said information from said server central processing unit to a plurality of client central processing units.

* * * * *